United States Patent
Kshirsagar et al.

[11] Patent Number: 6,030,583
[45] Date of Patent: *Feb. 29, 2000

[54] OXYGEN GENERATING COMPOSITIONS

[75] Inventors: Girish S. Kshirsagar, Lenexa; James C. Cannon; Yunchang Zhang, both of Overland Park, all of Kans.

[73] Assignee: BE Intellectual Property, Wellington, Fla.

[*] Notice: This patent is subject to a terminal disclaimer.

[21] Appl. No.: 09/017,014

[22] Filed: Feb. 2, 1998

Related U.S. Application Data

[63] Continuation-in-part of application No. 08/554,901, Nov. 9, 1995, Pat. No. 5,783,105.

[51] Int. Cl.⁷ .............. A62B 7/08; A62B 21/00; C01B 11/14; C01B 11/18
[52] U.S. Cl. .................. 422/126; 252/181.1; 252/181.31
[58] Field of Search ............... 252/187.1, 187.31; 422/126; 149/77, 113

[56] References Cited

U.S. PATENT DOCUMENTS

| | | | |
|---|---|---|---|
| 3,293,187 | 12/1966 | Markowitz | 252/187.31 |
| 3,736,104 | 5/1973 | Churchill et al. | 423/579 |
| 3,955,931 | 5/1976 | Thompson | 422/165 |
| 4,073,741 | 2/1978 | Heintz | 252/187.31 |
| 4,490,274 | 12/1984 | Maslyaev et al. | 252/186.22 |
| 5,049,306 | 9/1991 | Greer | 252/187.31 |
| 5,198,147 | 3/1993 | Zhang et al. | 252/187.31 |
| 5,279,761 | 1/1994 | Zhang et al. | 252/187.31 |
| 5,298,187 | 3/1994 | Zhang et al. | 252/187.31 |
| 5,338,516 | 8/1994 | Zhang et al. | 422/126 |
| 5,376,352 | 12/1994 | Peters et al. | 423/579 |
| 5,429,691 | 7/1995 | Hinshaw et al. | 149/45 |
| 5,439,537 | 8/1995 | Hinshaw et al. | 149/22 |
| 5,482,579 | 1/1996 | Ochi et al. | 149/83 |
| 5,783,105 | 7/1998 | Zhang et al. | 252/287.31 |
| 5,882,545 | 3/1999 | Zhang et al. | 252/187.31 |

FOREIGN PATENT DOCUMENTS 1035248A  9/1989  China .

OTHER PUBLICATIONS

SAE International Aerospace Standard; Aviator's Breathing Oxygen Purity Standard; SAE AS8010 Revision C; 1997–09.

Puritan–Bennett Aero Systems, Co.; Chemical Oxygen Generators for Aviation; 1972.

*Primary Examiner*—Joseph D. Anthony
*Attorney, Agent, or Firm*—Fulwider Patton Lee & Utecht, LLP

[57] ABSTRACT

The oxygen generating compositions contain carbon-free metal powder as fuel to minimize generation of carbon monoxide. The carbon-free metal powder can be selected from copper, zinc, and antimony, and mixtures thereof, and can be used in combination with tin or iron. The oxygen generating compositions produce a breathable gas upon ignition of the composition, and comprise about 1–15% by dry weight of the metal powder as a fuel; about 0.1–5% by dry weight of at least one alkaline compound; a transition metal oxide catalyst; and the remainder substantially comprising an oxygen source. The oxygen generating compositions can optionally include a binder. An oxygen generating candle can also have an ignition pellet having a composition of about 25–50% by weight copper, zinc or antimony, 5–20% by weight $Co_3O_4$, about 2–5% by weight glass powder, 0–25% by weight $KClO_4$, and the balance being substantially $NaClO_3$.

23 Claims, 1 Drawing Sheet

OXYGEN GENERATING COMPOSITIONS

RELATED APPLICATIONS

The application is a continuation-in-part of Ser. No. 08/554,901 filed Nov. 9, 1995 now U.S. Pat. No. 5,783,105.

BACKGROUND OF THE INVENTION

1. Field of the Invention

This invention relates generally to oxygen generating compositions, and more particularly concerns improved oxygen generation compositions containing copper, zinc, and antimony as a fuel.

2. Description of Related Art

Chemical oxygen generators are typically used in situations requiring the generation of supplemental oxygen, such as in aviation during accidental decompression, in submarines, and in other similar settings. Oxygen for such purposes must be of suitably high purity. For example, the requirements of SAE Aerospace Standard AS801OC are frequently applied to oxygen utilized in aviation applications. Chemical oxygen generating compositions based upon the decomposition of alkali metal chlorates or perchlorates have long been used as an emergency source of breathable oxygen, such as in passenger aircraft, for example. Oxygen generating compositions utilizing alkali metal chlorates or perchlorates are disclosed in U.S. Pat. Nos. 5,198,147; 5,279,761; and 5,298,187; each of which are incorporated herein by reference.

A typical chemical oxygen generating candle may have several layers with different compositions to obtain different reaction rates and flow rates which are desired at different stages of operation. Multiple layers with different formulas are used in the candle to meet the oxygen generation requirements, which can vary with time, such as when an airplane descends following a loss of cabin pressure. An aircraft oxygen generator is commonly preprogrammed according to the descent profile of a given type of airplane, and must meet the minimum oxygen flow requirement at all times during a descent.

The candle typically has a generally cylindrical shape with a taper, with a recess at one end to hold an ignition pellet. The ignition pellet is ignited by firing a primer, and heat from the ignition pellet then initiates the reaction of the candle body, generating oxygen.

In a typical chemical oxygen generator, a sodium chlorate candle is encased in a stainless steel canister, and oxygen is generated by decomposition of sodium chlorate in the presence of a commonly used fuel, such as iron, and a catalyst, which is commonly a transition metal oxide such as the oxide of cobalt, which is an expensive, strategic metal. The principal heat producing reactions are described by the following equations:

$$NaClO_3(s) \rightarrow NaCl(s) + (3/2)O_2(g) + Heat(14{,}731\ cal)$$

$$2Fe(s) + (3/2)O_2(g) \rightarrow Fe_2O_3(s) + Heat(198{,}500\ cal)$$

While iron powder has commonly been used in chlorate or perchlorate compositions as a fuel or catalyst for decomposition of the chlorates or perchlorates to release oxygen, such iron powder typically contains small amounts of carbon (0.02% to 1%) that can at times also contaminate the oxygen released with up to 1,000 ppm of carbon monoxide, as described in the following equations, and which must be removed to provide a safely breathable gas.

$$C + O_2 \rightarrow CO_2$$

$$C + \tfrac{1}{2}O_2 \rightarrow CO$$

The production of carbon monoxide by alkali metal chlorate or perchlorate compositions utilizing iron powder as a fuel can be explained by the fact that iron has a high affinity for carbon, and can form various compounds with carbon. Iron powder usually contains several hundred to several thousand ppm carbon. Upon oxidation of the iron powder in a chemical oxygen generator, part of the carbon content of the iron powder is converted to carbon monoxide at unacceptably unhealthy levels, so that the carbon monoxide must be removed from the oxygen produced. Above 710° C., thermodynamic constraints favor CO formation over formation of $CO_2$. Since iron is a very energetic fuel (1,777 cal/g), and loading can be relatively high in some portions of the candle, temperatures in excess of 710° C. can easily be reached. Even after oxygen evolution has ceased in those sections of the candle, temperatures typically continue to rise due to the oxidizing environment that is produced and can increase the extent of oxidation of iron. Thus, high levels of carbon monoxide in the oxygen produced by the initial stages of a candle fueled by carbon-containing metal powders such as iron, in excess of a maximum permissible level of 50 ppm, are common.

Carbon-free iron powder is difficult to obtain and expensive, so that in order to use iron powder as a fuel in an oxygen generator, it is necessary and economically preferable to utilize a Hopcalite filter to convert the carbon monoxide produced to the less toxic carbon dioxide. Unfortunately, the equipment necessary to filter and convert carbon monoxide to carbon dioxide not only increases manufacturing costs, but can also add up to 50 grams to the weight of an iron fueled oxygen generation system, which can be a considerable disadvantage if the oxygen generation system is to be used on board aircraft. The non-iron fuels manganese and silicon are not desirable, because they typically produce large amounts of highly toxic chlorine. As another alternative, oxygen generating compositions with no fuel are known, instead having high loadings of extremely moisture sensitive catalysts such as sodium oxide ($Na_2O$) to compensate for the lack of fuel. The generator formulation is dry and fuel free, to avoid the necessity of providing a filter, but such non-fueled oxygen generators are generally less reliable than fueled generators; and a non-fueled oxygen generator has difficulty achieving a full rate of flow within ten seconds during a cold test.

There is thus a need for a reliable, robust oxygen generator composition utilizing substantially carbon-free alternative fuels which are not as energetic as iron, do not produce high levels of chlorine characteristic of fuels such as manganese and silicon, to reduce or eliminate formation of toxic carbon monoxide that is formed due to carbon in metal powder used as a fuel for the oxygen generation process, to eliminate the need for a carbon monoxide Hopcalite filter and the possibility of carbon dioxide formation associated with such a traditional filter, and to generate oxygen at lower temperatures than in traditional iron fueled oxygen generators. The present invention meets these needs.

SUMMARY OF THE INVENTION

Briefly, and in general terms, the present invention provides for oxygen generating compositions containing carbon-free copper, zinc, and antimony metal powders to replace commonly used iron powder as the fuel for chemical oxygen candles, to thereby eliminate the need for carbon monoxide filter and the possibility of carbon dioxide formation associated with carbon monoxide filters. The use of copper, zinc, and antimony metal powders as the fuel in oxygen generating compositions can lower manufacturing costs, improve manufacturability, and reduce the weight of an oxygen generator, while at the same time lowering oxygen generator operating temperatures and improving block rheology of oxygen generators for smoother flow. The use of copper, zinc, and antimony metal powders as a fuel can also reduce or eliminate the need in oxygen generator compositions for the use of cobalt oxide, which is currently commonly used in all layers of typical oxygen generating candles. The copper, zinc, and antimony metal fuels of the invention can be used by themselves in oxygen generating compositions, in combination, and in combination with tin or iron.

The invention accordingly provides for an oxygen generating composition for producing a breathable gas upon ignition of the composition, comprising about 1–15% by dry weight of metal powder as a fuel, selected from the group consisting of at least one of copper, zinc and antimony, combinations thereof, combinations thereof with tin, and combinations thereof with iron. The composition also contains about 0.1–5% by dry weight of at least one alkaline compound, the alkaline compound having a metal moiety selected from the group consisting of magnesium, calcium, lithium and strontium, and the alkaline compound having an oxide moiety selected from the group consisting of oxides, peroxides, superoxides, and hydroxides. The composition further contains a transition metal oxide catalyst; and the remainder substantially comprises an oxygen source selected from the group consisting of alkali metal chlorates, alkali metal perchlorates, and mixtures thereof. In a presently preferred embodiment, the transition metal oxide catalyst comprises about 0.1 to 15% by dry weight of the oxygen generating composition and is selected from the group consisting of cobalt oxide, copper oxide and nickel oxide.

In another preferred aspect of the invention, an oxygen generating candle can also comprise an ignition pellet having a composition of about 25–50% by weight copper, zinc or antimony, 5–20% by weight $Co_3O_4$, about 2–5% by weight glass powder, 5–25% by weight $KClO_4$, and the balance being substantially $NaClO_3$. In one preferred embodiment, the ignition pellet has a composition of about 40% by weight of a metal powder selected from the group consisting of copper, zinc and antimony; about 15% by weight $Co_3O_4$; about 5% glass powder; about 10% by weight $KClO_4$; and about 30% $NaClO_3$.

These and other aspects and advantages of the invention will become apparent from the following detailed description and the accompanying drawing, which illustrates by example the features of the invention.

DETAILED DESCRIPTION OF THE PREFERRED EMBODIMENTS

Figure 1:
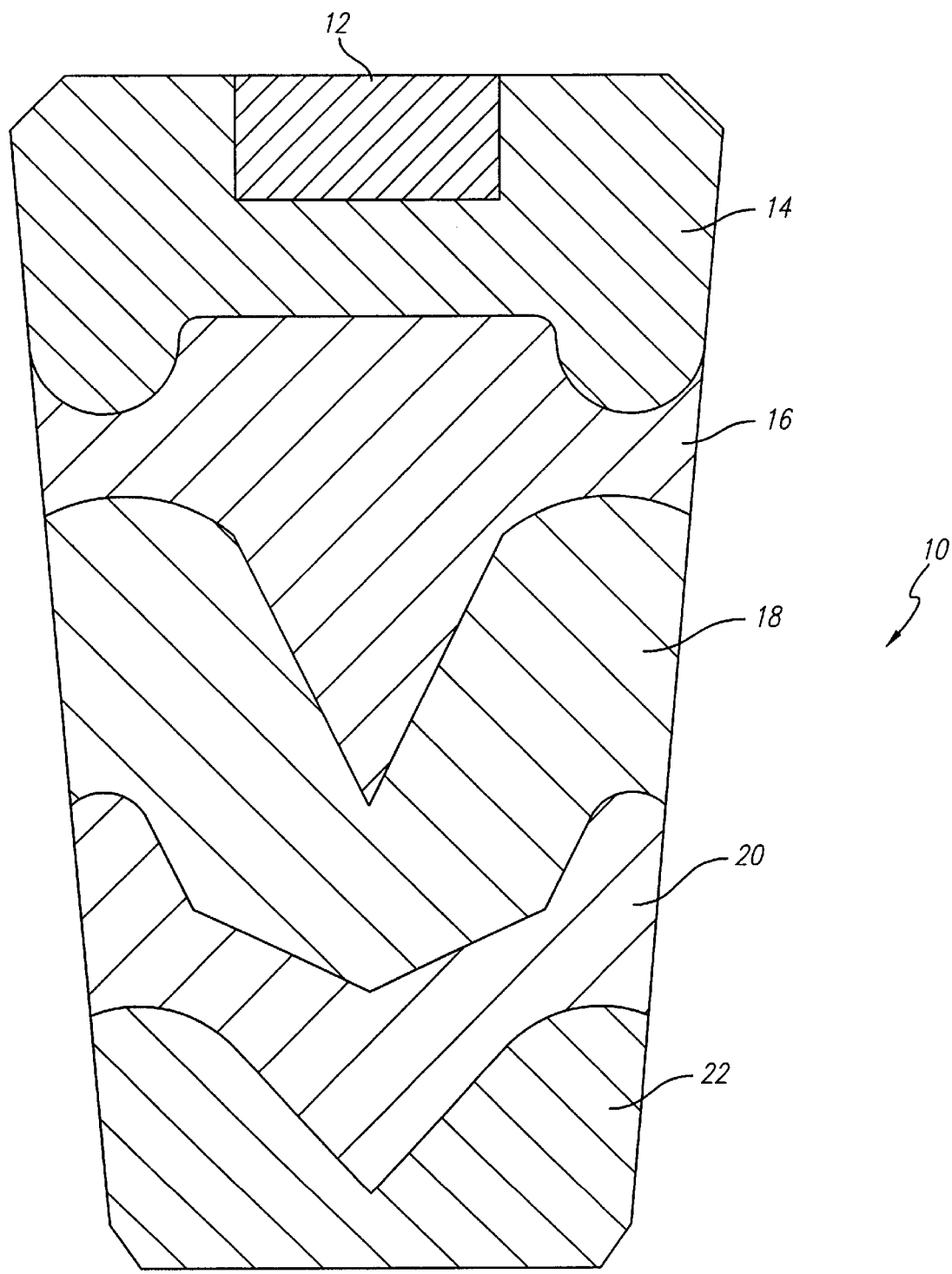
FIG. 1 is a cross sectional view of an oxygen generating candle formed from the oxygen generating composition according to the principles of the invention.

Iron fueled alkali metal chlorate or perchlorate compositions can release significant levels of carbon monoxide, which must be removed to provide a safely breathable gas. High temperatures of operation of oxygen generating compositions also increase the production of carbon monoxide. The equipment necessary to remove carbon monoxide is expensive and increases the weight of an iron fueled oxygen generation system.

The invention accordingly is embodied in an oxygen generating composition for producing a breathable gas upon ignition of the composition. In a presently preferred embodiment, the composition contains about 1–15% by dry weight of metal powder as a fuel, selected from the group consisting of at least one of copper, zinc and antimony, combinations thereof, combinations thereof with tin, and combinations thereof with iron. Zinc is less energetic than iron per unit weight, producing 1,273 cal/g; antimony is less energetic than zinc, producing 682 cal/g; and copper is less energetic than antimony, producing 606 cal/g. Zinc powder used as a fuel typically produces more heat than copper per unit weight, yet can be safely used in a dry manufacturing process. Copper, zinc and antimony can be used in place of tin or iron, or in combination with tin or iron as a fuel.

In one presently preferred, when tin is to be used in combination with one or more of copper, zinc and antimony as a fuel, tin powder having a high purity and a small particle size is used. Tin powder with a particle size smaller than 325 mesh is preferred, even though coarser tin powder can also be satisfactory.

Copper does not melt under normal operating conditions (copper melts at 1,085° C.), and therefore can help as a rheology support, especially for functional vibration tests. Copper oxide is also a catalytically active material which can potentially eliminate the use of very expensive cobalt oxide catalyst currently in all layers of the candle. This also simplifies the manufacturing process. In addition, experiments have shown that the use of copper helps improve the rheology of tin pellets in addition to eliminating smog generated during burning of the pellet, when used in appropriate amounts.

Zinc oxide, like tin oxide, is not an active catalyst, but zinc metal has a higher melting point (420° C.) than tin (232° C.), that is well within the useful range of temperatures attained in different layers of a candle. It is especially suited for a "dry process."

Antimony is similar to copper in that its oxide is also an active catalyst, but antimony melts at a relatively low temperature of 631° C., still within the useful range of temperatures found in a candle.

The composition also contains about 0.1–5% by dry weight of at least one alkaline compound as a chlorine remover and reaction rate modifier. In a presently preferred embodiment, the alkaline compound has a metal moiety selected from the group consisting of magnesium, calcium, lithium and strontium, and an oxide moiety selected from the group consisting of oxides, peroxides, superoxides, and hydroxides.

The composition also preferably contains a transition metal oxide catalyst comprising about 0.1 to 15% by dry weight of the oxygen generating composition. The transition metal oxide catalyst can, for example, be selected from the group consisting of oxides of cobalt such as $CoO$, $Co_3O_4$, $Co_2O_3$, and $CoO_x$, where x equals 1.0 to 1.5, nickel oxide, copper oxide, iron oxide, and mixtures thereof. The presently preferred transition metal oxide catalysts are cobaltocobaltic oxide ($Co_3O_4$), nickel oxide and copper oxide.

There are advantages to using an alkaline compound as a reaction rate inhibitor when cobalt oxide is used, because cobalt oxide is so active that the decomposition reaction occurs in the solid phase. The forces exerted by gas evolution in the solid phase can cause cracking of the chemical core, which can undesirably lead to less uniform reaction. By reducing the catalytic activity, the reaction temperature can be raised slightly, so that the reaction occurs in a viscous molten phase. This permits smooth release of the oxygen gas generated through the decomposition of the chlorate or perchlorate.

The oxygen generating compositions of the invention can also optionally further include up to about 5% of one or more binders. In a presently preferred embodiment, the binder can be an inorganic binder such as glass powder, glass fiber, fiberglass, ceramic fiber, steel wool, bentonite, kaolinite and mixtures thereof, for example, although other inorganic binders can also be suitable.

The remainder of the oxygen generating composition preferably substantially comprises an oxygen source selected from the group consisting of alkali metal chlorates, alkali metal perchlorates, and mixtures thereof. The alkali metal chlorate can be sodium chlorate, potassium chlorate, or lithium chlorate, for example, and the alkali metal perchlorate can be potassium perchlorate, lithium perchlorate, or sodium perchlorate, for example, although other alkali metal chlorates and perchlorates may be suitable. The presently preferred chlorate is sodium chlorate, and the presently preferred perchlorate is potassium perchlorate. Sodium chlorate is presently preferred as an oxygen source because it has a relatively high oxygen yield per unit weight compared to potassium chlorate, and a reasonably low decomposition temperature compared to potassium chlorate and perchlorate and lithium perchlorate. Decomposition of sodium chlorate is exothermic once initiated, which permits a self-sustaining operation of an oxygen generating candle or core formed from the oxygen generating compositions of the invention. Sodium chlorate is also currently preferred as the oxygen source due to its currently relatively low price. In one presently preferred aspect of the invention, the oxygen source can alternatively be a combination of a major amount of sodium chlorate and a minor amount of potassium perchlorate.

In one presently preferred embodiment of the invention, the oxygen generating composition can comprise about 1–15% by dry weight of metal powder as a fuel, selected from the group consisting of at least one of copper, zinc and antimony, combinations thereof, combinations thereof with tin, and combinations thereof with iron; about 0.1–5% by dry weight of at least one alkaline compound selected from the group consisting of oxides, peroxides, superoxides, and hydroxides of magnesium, calcium, lithium and strontium; about 0.1 to 15% by dry weight of at least one transition metal oxide catalyst; from zero to about 5% by dry weight of a binder material; and the remainder substantially comprising an oxygen source selected from the group consisting of alkali metal chlorates, alkali metal perchlorates, and mixtures thereof.

In forming an oxygen generating core or candle, the metal fuel powder, metal oxide catalyst, alkaline compound, and the inorganic binder (if used) are premixed. The oxygen source chlorate/perchlorate component is typically separately mixed with approximately 1 to 5% water, by weight, which is used as a lubricant to facilitate the formation of the oxygen generating cores or candles. The premixed powder is then mixed with the wet chlorate/perchlorate. The chemical oxygen candles are formed by compaction of the damp mixture in a mold, and are then dried at about 120° C. to remove the water that was added during the mixing process. However, a small residue of water may remain in the oxygen generating composition even after drying.

With reference to FIG. 1, a typical chemical oxygen generating candle 10 commonly is composed of several layers, with each layer having a different formulation. The multiple layers with different formulations can thus be designed to match the desired oxygen generation rate, based upon specified requirements of the application, since different applications may have different oxygen generation rate requirements. While the oxygen generating candle shown in FIG. 1 has 5 layers, any number of layers can be used to form the oxygen generating candle. The metal powder is currently preferably used as a fuel in one or more of the layers, depending upon the application. The various types of interface shapes between layers, shown in FIG. 1, are used to help control the transition of the reaction as it progresses from one layer to another. The interface shapes and relative sizes and reactivities of the layers can be modified, depending upon the requirements of the specific applications of the oxygen generating candles.

At the top of the candle there is a recess to hold a highly ignitable and heat producing ignition pellet 12, which can be ignited by firing a percussion primer, for example, generating sparks that ignite the ignition pellet to initiate the reaction of the first layer of the candle. Even though the ignition pellet is relatively small, it is rich in fuel and can contribute up to 50% of the carbon monoxide impurity that is detected within the first minute of candle operation when iron powder is used as the fuel. Incorporation of a carbon free fuel in the ignition pellet itself can significantly reduce carbon monoxide impurities in breathing gas produced by the oxygen generating candle.

An ignition pellet prepared according to the invention can typically weigh less than 2 grams, for example, and typically has a composition of about 25–50% by weight copper, zinc or antimony, about 5–20% by weight $Co_3O_4$, about 2–5% by weight glass powder, about 0–25% by weight $KClO_4$, and the balance (up to about 63% by weight) being substantially $NaClO_3$. Typically up to about 5% water is added into the powder mixture to facilitate molding. The ignition pellets are pressed, and then dried at approximately 120° C. to remove the water added for molding. In a presently preferred embodiment, the composition of an ignition pellet comprises about 40% by weight of a metal powder selected from copper, zinc and antimony, about 15% by weight $Co_3O_4$, about 5% by weight glass powder, about 10% by weight $KClO_4$, and about 30% by weight $NaClO_3$. The heat from the ignition pellet is then sufficient to initiate the successive decomposition of the layers 14, 16, 18, 20 and 22 of the oxygen generating candle to release oxygen.

In one presently preferred embodiment, a typical range of compositions, in which percentages are by dry weight, for candle layers 14, 16, 18, 20 and 22 of an oxygen generating candle are as follows:

Layer 1: 10–15% Cu, 6–15% $Co_3O_4$ as a catalyst, 0–5% glass powder, and the remainder $NaClO_3$, $KClO_4$, or other similar oxygen producing compound.

Layer 2: 6–9% Cu, 1–3% $Co_3O_4$ as a catalyst, 0–5% glass powder, 0.5% to 4% alkaline compound such as $BaO_2$, $Ca(OH)_2$ or MgO, and the remainder $NaClO_3$, $KClO_4$, or other similar oxygen producing compound.

Layer 3: 4–7% Cu, 1–1.5% $Co_3O_4$ as a catalyst, 0–5% glass powder, 0.5% to 4% alkaline compound such as $BaO_2$, $Ca(OH)_2$ or MgO, and the remainder $NaClO_3$, $KClO_4$ or other similar oxygen producing compound.

Layer 4: 2–6% Cu, 0.1–1% $Co_3O_4$ as a catalyst, 0–5% glass powder, 0.5% to 4% alkaline compound such as $BaO_2$, $Ca(OH)_2$ or MgO, and the remainder $NaClO_3$, $KClO_4$ or other similar oxygen producing compound.

Layer 5: 1–3% Cu, 0.1–1% $Co_3O_4$ as a catalyst, 2.5% glass powder, 0.5% to 4% alkaline compound such as $BaO_2$, $Ca(OH)_2$ or MgO, and the remainder $NaClO_3$, $KClO_4$, or other similar oxygen producing compound.

In each layer, the remainder portion (as needed to a total of 100% by weight, on a dry basis) can substantially comprise $NaClO_3$, $KClO_4$, or other similar oxygen producing compound. The water content as a binding and molding aid (prior to drying) can be varied between about 1% and 5% of the total weight. Formulations with zinc and antimony powder as the metal fuel can be similar to the preceding formulations using copper, and can be further adjusted to reflect the higher heats of oxidation, such as by reducing the amount of the catalyst in a layer, by reducing the loading of the metal fuel, or both, to suit the particular requirement.

The oxygen generating compositions of the invention are further illustrated in the following examples, in which percentages are by weight.

EXAMPLE 1

Layer 1: 18 grams: 13% Cu, 11% $Co_3O_4$, 4% glass powder, and 72% $NaClO_3$.
Layer 2: 45 grams: 7% Cu, 1.7% $Co_3O_4$, 2.5% glass powder, 1% MgO, and 87.8% $NaClO_3$.
Layer 3: 70 grams: 6.5% Cu, 1.35% $Co_3O_4$, 2.5% glass powder, 0.5% $Ca(OH)_2$, and 89.15% $NaClO_3$.
Layer 4: 100 grams: 5.5% Cu, 0.45% $Co_3O_4$, 2.5% glass powder, 1% $Ca(OH)_2$, and 90.55% $NaClO_3$.
Layer 5: 50 grams: 3.0% Cu, 0.40% $Co_3O_4$, 2.5% glass powder, 0.5% $Ca(OH)_2$, and 93.1% $NaClO_3$.

The chemical compositions for each of these layers of the oxygen generating candle were prepared, a small amount of water in the range of 1.5 to 4% was added and mixed well with each composition layer, and the layers were sequentially poured into a mold. To provide a smooth transition from one layer to the next layer, various shapes of interface tools were used between adjacent layers. Various interface tools can be used, such as a solid cone, for example, that will create a conical cavity with a wall thickness as desired. The cavity can then be filled with the mixed composition from the next layer, and so on, so that a desired flow profile can be maintained or achieved, with smooth transitions between compositions of the different layers that are used to achieve the desired flow rates. A tapered cylindrical shaped chemical oxygen candle was then formed by pressing the layers in the mold. The candle was then dried at a temperature of between 110–130° C. to remove the water added.

The dried candle was then loaded with an ignition pellet containing zinc as fuel into a stainless steel container. When ignited, the candle reacted for about 14.45 minutes, generating approximately 82.4 liters of oxygen at room temperature. The average carbon monoxide concentration in the oxygen generated was about 12 ppm, without using a carbon monoxide filter. This carbon monoxide level meets the purity requirement of most airframe manufacturers.

EXAMPLE 2

Layer 1: 18 grams: 13% Cu, 11% $Co_3O_4$, 4% glass powder, and 72% $NaClO_3$.
Layer 2: 45 grams: 7% Cu, 1.7% $Co_3O_4$, 2.5% glass powder, 1% MgO, and 87.8% $NaClO_3$.
Layer 3: 70 grams: 6.5% Cu, 1.35% $Co_3O_4$, 2.5% glass powder, 0.5% $Ca(OH)_2$, and 89.15% $NaClO_3$.
Layer 4: 100 grams: 5.5% Cu, 0.45% $Co_3O_4$, 2.5% glass powder, 1% $Ca(OH)_2$, and 90.55% $NaClO_3$.
Layer 5: 50 grams: 1.5% Zn, 0.40% $Co_3O_4$, 2.5% glass powder, 0.5% $Ca(OH)_2$, and 94.6% $NaClO_3$.

The oxygen generating candle was prepared in the same manner as in Example 1. When ignited, the candle operated for about 18.3 minutes, and generated approximately 81.1 liters of oxygen at room temperature.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An oxygen generating composition for producing a breathable oxygen gas upon ignition of the composition, comprising:
    a metal powder as a fuel, said fuel selected from the group consisting of copper, zinc and antimony, combinations thereof, combinations thereof with tin, and combinations thereof with iron;
    at least one alkaline compound;
    at least one transition metal oxide catalyst; and
    an oxygen source selected from the group consisting of alkali metal chlorates, alkali metal perchlorates, and mixtures thereof, said composition being operable for producing breathable oxygen for a period of several minutes.

2. The oxygen generating composition of claim 1, wherein said alkaline compound has a metal moiety and an oxide moiety, said metal moiety being selected from the group consisting of magnesium, calcium, lithium and strontium, and said oxide moiety being selected from the group consisting of oxides, peroxides, superoxides, and hydroxides.

3. The oxygen generating composition of claim 1, wherein said transition metal oxide catalyst is selected from the group consisting of CoO, $Co_3O_4$, $Co_2O_3$, and $CoO_x$, where x equals 1.0 to 1.5, nickel oxide, copper oxide, iron oxide, and mixtures thereof.

4. The oxygen generating composition of claim 1, wherein said transition metal oxide catalyst comprises about 0.1 to 15% by dry weight of the oxygen generating composition and is selected from the group consisting of cobalt oxide, copper oxide and nickel oxide.

5. The oxygen generating composition of claim 1, wherein said transition metal oxide catalyst is $Co_3O_4$.

6. The oxygen generating composition of claim 1, wherein said alkaline compound is selected from the group consisting of $BaO_2$, $Ca(OH)_2$, MgO, and mixtures thereof.

7. The oxygen generating composition of claim 1, further comprising a binder selected from the group consisting of glass powder, fiber glass, ceramic fiber, steel wool, bentonite, kaolinite and mixtures thereof.

8. An oxygen generating composition for producing a breathable oxygen gas upon ignition of the composition, consisting essentially of:
    about 1–15% by dry weight of metal powder as a fuel, selected from the group consisting of copper, zinc and antimony, combinations thereof, combinations thereof with tin, and combinations thereof with iron;
    about 0.1–5% by dry weight of at least one alkaline compound, the alkaline compound having a metal moiety selected from the group consisting of magnesium, calcium, lithium and strontium, and the alkaline compound having an oxide moiety selected from the group consisting of oxides, peroxides, superoxides, and hydroxides;
    about 0.1 to 15% by dry weight of at least one transition metal oxide catalyst;
    from zero to about 5% by dry weight of a binder material; and
    the remainder substantially comprising an oxygen source selected from the group consisting of alkali metal chlorates, alkali metal perchlorates, and mixtures thereof said composition being operable for producing breathable oxygen for a period of several minutes.

9. The oxygen generating composition of claim 8, wherein the transition metal oxide catalyst is selected from the group consisting of cobalt oxide, copper oxide and nickel oxide.

10. The oxygen generating composition of claim 8, wherein binder material is selected from the group consisting of glass powder, fiber glass, ceramic fiber, steel wool, bentonite, kaolinite and mixtures thereof.

11. The oxygen generating composition of claim 8, wherein said alkaline compound is selected from the group consisting of $BaO_2$, $Ca(OH)_2$, $MgO$, and mixtures thereof.

12. An oxygen generating candle for producing a breathable oxygen gas upon ignition of the candle, said candle comprising:

a plurality of layers of oxygen generating compositions, each including a metal powder as a fuel, said metal powder being selected from the group consisting of copper, zinc and antimony, combinations thereof, combinations thereof with tin, and combinations thereof with iron; at least one alkaline compound; at least one transition metal oxide catalyst; and an oxygen source selected from the group consisting of alkali metal chlorates, alkali metal perchlorates, and mixtures thereof; and an ignition pellet adjacent to one of said layers, said ignition pellet consisting essentially of about 25–50% by weight of a metal fuel selected from the group consisting of copper, zinc and antimony; about 5–20% by weight $Co_3O_4$; about 2–5% by weight glass powder; 0–25% by weight $KClO_4$, and the remainder being substantially $NaClO_3$, said oxygen generating candle being operable for producing breathable oxygen for a period of several minutes.

13. The oxygen generating candle of claim 12, wherein the transition metal oxide catalyst is selected from the group consisting of cobalt oxide, copper oxide and nickel oxide.

14. The oxygen generating candle of claim 12, wherein at least one of said plurality of layers further comprises a binder material selected from the group consisting of glass powder, fiber glass, ceramic fiber, steel wool, bentonite, kaolinite and mixtures thereof.

15. The oxygen generating candle of claim 12, wherein said alkaline compound consists of a metal moiety and an oxide moiety, said metal moiety being selected from the group consisting of magnesium, calcium, lithium and strontium, and said oxide moiety being selected from the group consisting of oxides, peroxides, superoxides, and hydroxides.

16. The oxygen generating candle of claim 12, wherein said alkaline compound is selected from the group consisting of $BaO_2$, $Ca(OH)_2$, $MgO$, and mixtures thereof.

17. The oxygen generating candle of claim 12, wherein said ignition pellet consists essentially of about 40% by weight of a metal powder selected from the group consisting of copper, zinc and antimony; about 15% by weight $Co_3O_4$; about 5% glass powder; about 10% by weight $KClO_4$; and about 30% $NaClO_3$.

18. An oxygen generating candle for producing a breathable oxygen gas upon ignition of the candle, said candle comprising:

a plurality of layers of oxygen generating compositions each including about 1–15% by dry weight of metal powder as a fuel, selected from the group consisting of copper, zinc and antimony, combinations thereof, combinations thereof with tin, and combinations thereof with iron; about 0.1–5% by dry weight of at least one alkaline compound, the alkaline compound having a metal moiety selected from the group consisting of magnesium, calcium, lithium and strontium, and the alkaline compound having an oxide moiety selected from the group consisting of oxides, peroxides, superoxides, and hydroxides; about 0.1 to 15% by dry weight of at least one transition metal oxide catalyst; from zero to about 5% by dry weight of a binder material; and the remainder substantially comprising an oxygen source selected from the group consisting of alkali metal chlorates, alkali metal perchlorates, and mixtures thereof; and an ignition pellet consisting essentially of about 25–50% by weight of a metal fuel selected from the group consisting of copper, zinc and antimony; about 5–20% by weight $Co_3O_4$; about 2–5% by weight glass powder; 0–25% by weight $KClO_4$, and the remainder being substantially $NaClO_3$, said oxygen venerating candle being operable for producing breathable oxygen for a period of several minutes.

19. The oxygen generating candle of claim 18, wherein said transition metal oxide catalyst is selected from the group consisting of cobalt oxide, copper oxide and nickel oxide.

20. The oxygen generating candle of claim 18, wherein said binder material is selected from the group consisting of glass powder, fiber glass, ceramic fiber, steel wool, bentonite, kaolinite and mixtures thereof.

21. The oxygen generating candle of claim 18, wherein said ignition pellet consists essentially of about 40% by weight of a metal powder selected from the group consisting of copper, zinc and antimony; about 15% by weight $Co_3O_4$; about 5% glass powder; about 10% by weight $KClO_4$; and about 30% $NaClO_3$.

22. An ignition pellet for an oxygen generating candle producing a breathable oxygen gas upon ignition of the ignition pellet, said ignition pellet consisting essentially of:

about 25–50% by weight of a metal fuel selected from the group consisting of copper, zinc and antimony;

about 5–20% by weight $Co_3O_4$;

about 2–5% by weight glass powder;

0–25% by weight $KClO_4$; and the remainder being substantially $NaClO_3$, said composition being useful for igniting a chemical oxygen generating mass.

23. The ignition pellet of claim 22, consisting essentially of:

about 40% by weight of a metal powder selected from the group consisting of copper, zinc and antimony;

about 15% by weight $Co_3O_4$;

about 5% glass powder;

about 10% by weight $KClO_4$; and about 30% $NaClO_3$.

* * * * *